(12) United States Patent
Kohno et al.

(10) Patent No.: US 7,076,352 B2
(45) Date of Patent: Jul. 11, 2006

(54) ELECTRIC POWER STEERING APPARATUS AND ANGLE COMPENSATING METHOD THEREFOR

(75) Inventors: Toshio Kohno, Nagoya (JP); Atsuhisa Asada, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/942,878

(22) Filed: Sep. 17, 2004

(65) Prior Publication Data

US 2005/0065686 A1  Mar. 24, 2005

(30) Foreign Application Priority Data

Sep. 18, 2003  (JP) .............................. 2003-326059

(51) Int. Cl.
*B62D 6/00* (2006.01)
*B62D 1/16* (2006.01)
(52) U.S. Cl. .......................... 701/41; 318/138; 324/160
(58) Field of Classification Search .................. 701/41; 318/138, 439, 560, 599, 432, 434, 632; 324/160, 324/161, 165
See application file for complete search history.

(56) References Cited

U.S. PATENT DOCUMENTS 4,756,376 A * 7/1988 Shimizu ...................... 180/444
5,198,981 A * 3/1993 Collier-Hallman et al. ... 701/42
5,760,562 A * 6/1998 Woodland et al. ........... 318/632
6,525,502 B1 * 2/2003 Piedl et al. .................. 318/605
6,536,293 B1 * 3/2003 Shiba ...................... 73/862.193
6,931,918 B1 * 8/2005 Herb ........................... 73/116
2002/0124663 A1 * 9/2002 Tokumoto et al. ..... 73/862.333

FOREIGN PATENT DOCUMENTS

| EP | 1 344 711 A2 | 9/2003 |
| JP | 8-210874 | 8/1996 |
| JP | 8-289521 | 11/1996 |
| JP | 11-321689 | 11/1999 |
| WO | WO 2004/005843 | 1/2004 |

\* cited by examiner

*Primary Examiner*—Dalena Tran
(74) *Attorney, Agent, or Firm*—Oblon, Spivak, McClelland, Maier & Neustadt, P.C.

(57) ABSTRACT

An electric power steering apparatus includes a first resolver whose pole pair number is 'm' and a second resolver whose pole pair 'n'. The electric power steering apparatus further includes a torsion calculating means which calculates the a torsion angle of the torsion bar from a difference between the rotating angle detected by the first resolver and the rotating angle detected by the second resolver. The torsion calculating means compensates the angle difference by a compensation value obtained by a table on the basis of the value obtained by multiplying an electrical angle of the first resolver by 'n' and the value obtained by multiplying an electrical angle of the second resolver by 'm'.

9 Claims, 11 Drawing Sheets

| TABLE No. | Δθ = θe1*6 - θe2*5 | REPEATING NUMBER | | COMPENSATION VALUE β |
|---|---|---|---|---|
| | | N1 | N2 | |
| 0 | -1800 ≤ Δθ < -1620 | 0 | 0 | -1800 deg |
| 1 | -1620 ≤ Δθ < -1260 | 4 | 4 | -1440 deg |
| 2 | -1260 ≤ Δθ < -900 | 3 | 3 | -1080 deg |
| 3 | -900 ≤ Δθ < -540 | 2 | 2 | -720 deg |
| 4 | -540 ≤ Δθ < -180 | 1 | 1 | -360 deg |
| 5 | -180 ≤ Δθ < 180 | 0 | 0 | 0 deg |
| 6 | 180 ≤ Δθ < 540 | 4 | 5 | 360 deg |
| 7 | 540 ≤ Δθ < 900 | 3 | 4 | 720 deg |
| 8 | 900 ≤ Δθ < 1260 | 2 | 3 | 1080 deg |
| 9 | 1260 ≤ Δθ < 1620 | 1 | 2 | 1440 deg |
| 10 | 1620 ≤ Δθ < 1980 | 0 | 1 | 1800 deg |
| 11 | 1980 ≤ Δθ < 2160 | 4 | 5 | 2160 deg |

ELECTRIC POWER STEERING APPARATUS AND ANGLE COMPENSATING METHOD THEREFOR

CROSS-REFERENCE TO RELATED APPLICATION

This application based on and claims priority under 35 U.S.C. §119 to Japanese Patent Application No. 2003-326059 filed on Sep. 18, 2003, the entire contents of which are incorporated herein by reference.

BACKGROUND OF THE INVENTION

1. Field of the Invention

The present invention relates to an electric power steering apparatus for detecting steering torque on the basis of a difference between rotating angles of first and second resolvers which are located at both ends of a torsion bar connected to a steering wheel, and for assisting a steering operation by controlling a motor in accordance with assist amount determined on the basis of the steering torque.

2. Description of the Related Art

Conventionally, an electric power steering apparatus, which reduces steering force through a steering wheel by providing a steering mechanism connected to a steering shaft with assist force by a motor, has been known. In the conventional electric power steering apparatus, a torque sensor using a torsion bar may be employed for detecting a steering torque. Specifically, the torsion bar with a pair of rotating angle sensors is disposed between the steering shaft and a steering gear box. Torsion of the torsion bar, i.e. the steering torque, is calculated from difference between rotating angles detected by first and second rotating angle sensors. As the rotating angle sensors for the torque sensor, resolvers can be employed because of its high mechanical reliability. The electric power steering apparatus having the aforementioned structure is described in Japanese Patent Laid-Open Publication No. 11-321689.

In the torque sensor having a pair of resolvers disposed at the both ends of the torsion bar, a malfunction of the sensor is detected in such a way that described in Japanese Patent Laid-Open Publication No. 8-289521 or No. 8-210874. The aforementioned way for detecting the malfunction depends on that the sum of the square of the amplitude of the Sin signal and the amplitude of the Cos signal, which are output signal from the resolver, is a constant value ($A*Sin^2 + A*Cos^2 = c$, 'A' and 'c' mean constant value). Therefore, when the sum ($A*Sin^2 + A*Cos^2$) of the squares exceeds predetermined threshold value, it is judged that malfunction occurs.

However, the detection of the torsion of the torsion bar using a pair of resolver needs complicated calculations. Therefore, the calculations for obtaining the steering torque and the steering angle are also complicated.

Further, since the resolver including winding coils is a kind of the electrical transformer, amplitudes of Sin phase signal and Cos phase signal vary in accordance with temperature variation. Therefore, a threshold value for aforementioned malfunction judging is needed to set at a value that temperature variation offset value T is added to the C (constant value). The temperature variation offset value T may set to be relatively large value to avert errors in detection caused by temperature variation. Accordingly, it is difficult to detect the malfunction immediately, and accuracy of the malfunction judging is deteriorated by temperature variation.

SUMMARY OF THE INVENTION

The present invention has been devised to solve the above-described problems, and an object of the present invention is to provide an electric power steering apparatus capable of the detecting steering torque properly and high accuracy in simple ways by using resolvers whose mechanical reliability is high.

In order to achieve the above and other objects, present invention provides the power steering apparatus including steering wheel, a first resolver, second resolver and the motor. The first resolver of the pole pair number 'm' detects a rotating angle of the steering shaft and the second resolver of the pole pair number 'n' detects a rotating angle of the steering shaft through a torsion bar. The electric power steering apparatus further includes a torsion calculating means for calculating the torsion angle of the torsion bar from a difference between the rotating angle detected by the first resolver and the rotating angle detected by the second resolver, and a motor controlling means for controlling the motor on the basis of an assist amount derived from the calculated torsion angle. The torsion calculating means includes a table, for obtaining the compensation value in accordance with the value calculated by multiplying a electrical angle of the first resolver by 'n' and the value calculated by multiplying a electrical angle of the second resolver by 'm'.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawing, in which.

DESCRIPTION OF THE PREFERRED EMBODIMENT

A preferred embodiment of an electric power steering apparatus according to the present invention will be described with reference to accompanying drawings.

Figure 1:
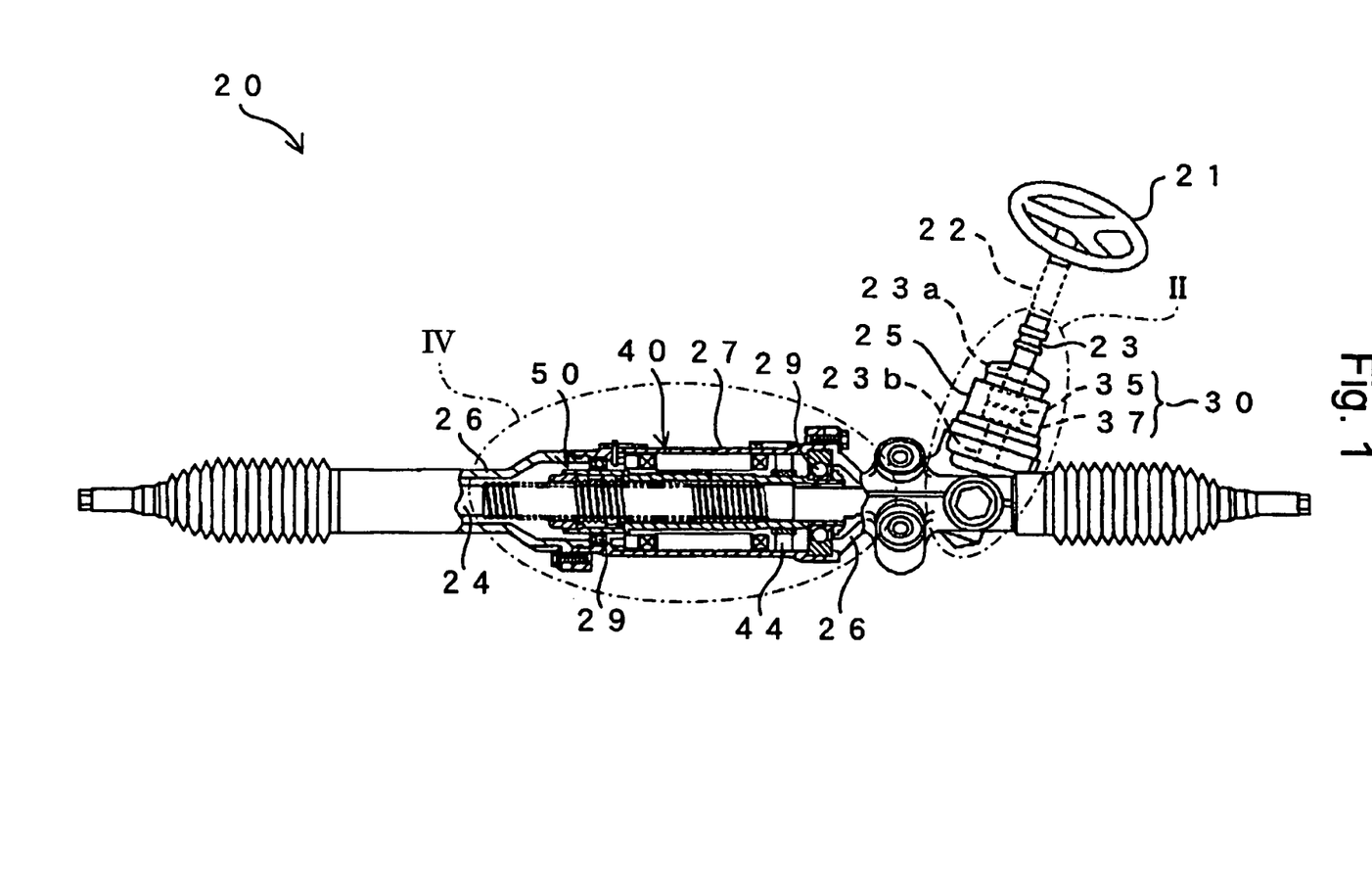
FIG. 1 shows an overall structure of an electric power steering apparatus according to one embodiment of the present invention.

Main configuration of the electric power steering apparatus 20 of this embodiment will be described with reference to FIGS. 1 through 4. As shown in FIG. 1 and FIG. 5, the electric power steering apparatus 20 is mainly composed of a steering wheel 21, a steering shaft 22, a pinion shaft 23, a rack shaft 24, a torque sensor 30, a motor 40, a motor resolver 44, ball screw mechanism 50, ECU (electronic control unit) 60 and the like. The electric power steering apparatus detects the steering state of steering wheel 21, and generates an assisting force corresponding to the steering state by the motor 40 so as to assist the steering operation of a driver. Steered wheels (not shown) are connected to both ends of the rack shaft 24 respectively through a tie rod and the like. The ECU 60 serves as torsion calculating means and a motor controlling means.

Figure 2:
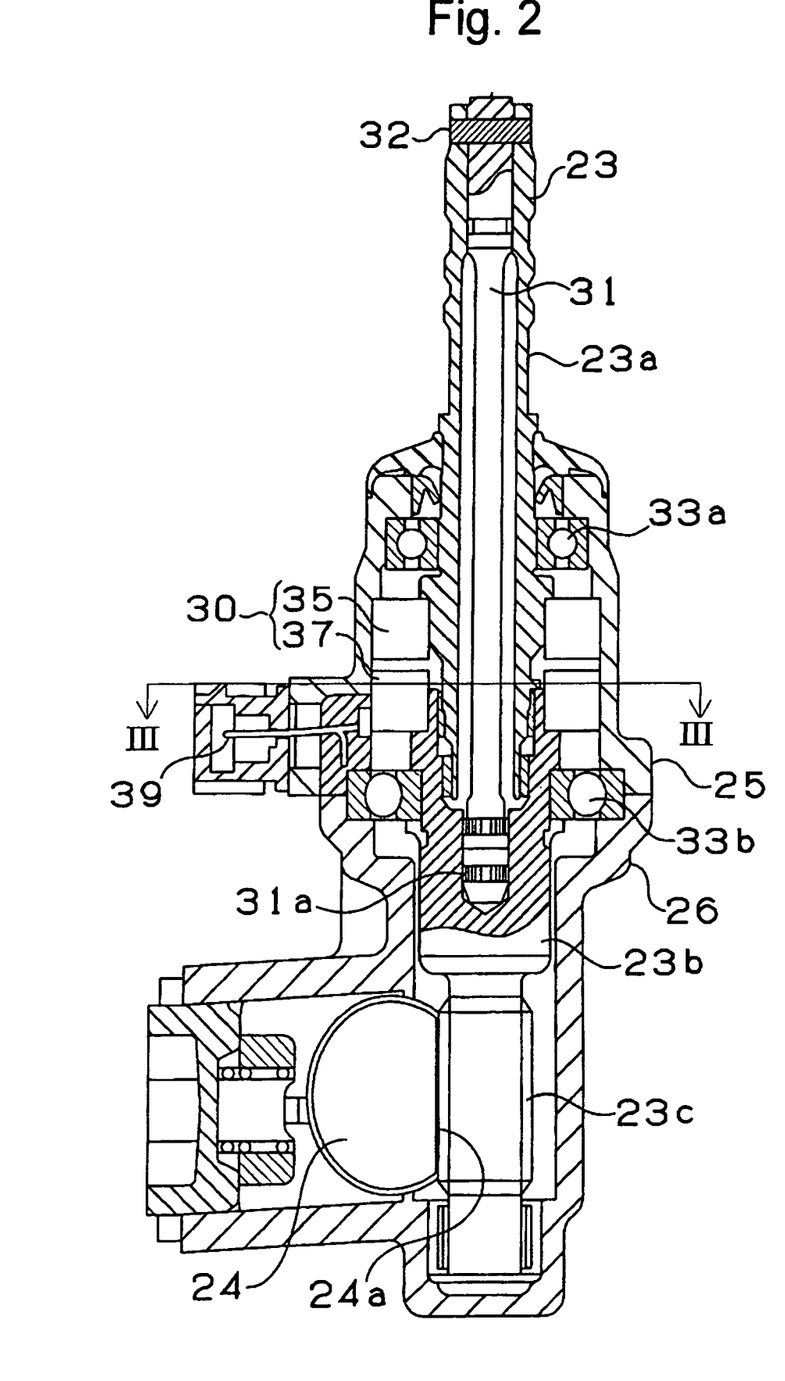
FIG. 2 is an enlarged view of the part surrounded by the ellipse designated by the dashed line II in FIG. 1

Specifically, as shown in FIG. 1 and FIG. 2, the steering wheel 21 is connected to one end of the steering shaft 22. The other end of the steering shaft 22 is connected to one end of a torsion bar 31 and an input shaft 23a of the pinion shaft 23, which is accommodated in a pinion housing 25, by means of a pin 32. The other end 31a of the torsion bar 31 is press fitted into one end of an output shaft 23b of the pinion shaft 23.

In the pinion housing 25, the input shaft 23a and output shaft 23b are rotatably supported by bearings 33a and 33b, respectively. A first resolver 35 is provided between the input shaft 23a and the pinion housing 25. A second resolver 37 is provided between the output shaft 23b and the pinion housing 25. The first resolver 35 and second resolver 37 are capable of detecting a steering angle of the steering wheel 21, and are electrically connected to the ECU 60 (referring to FIG. 5) through a terminal 39 (referring to FIG. 2).

The other end of the output shaft 23b of the pinion shaft 23 is formed with a pinion gear 23c. The pinion gear 23c meshes with a rack tooth 24a of the rack shaft 24 so as to construct a rack and pinion mechanism.

With this configuration, the steering shaft 22 is connected to the output shaft 23b of the pinion shaft 23 so as to be able to relatively rotate with each other. The rotating angle of the steering shaft 22, i.e. rotating angle (mechanical angle) $\theta m$ of steering wheel, can be detected on the basis of a first rotating angle (electrical angle) $\theta e1$ by the first resolver 35 and a second rotating angle (electrical angle) $\theta e2$ by the second resolver 37. Further, torsion amount of the torsion bar 31 (torsion amount is corresponding to steering torque) can be detected as torsion angle in accordance with an angle difference between first rotating angle $\theta e1$ and second rotating angle $\theta e2$.

Figure 3:
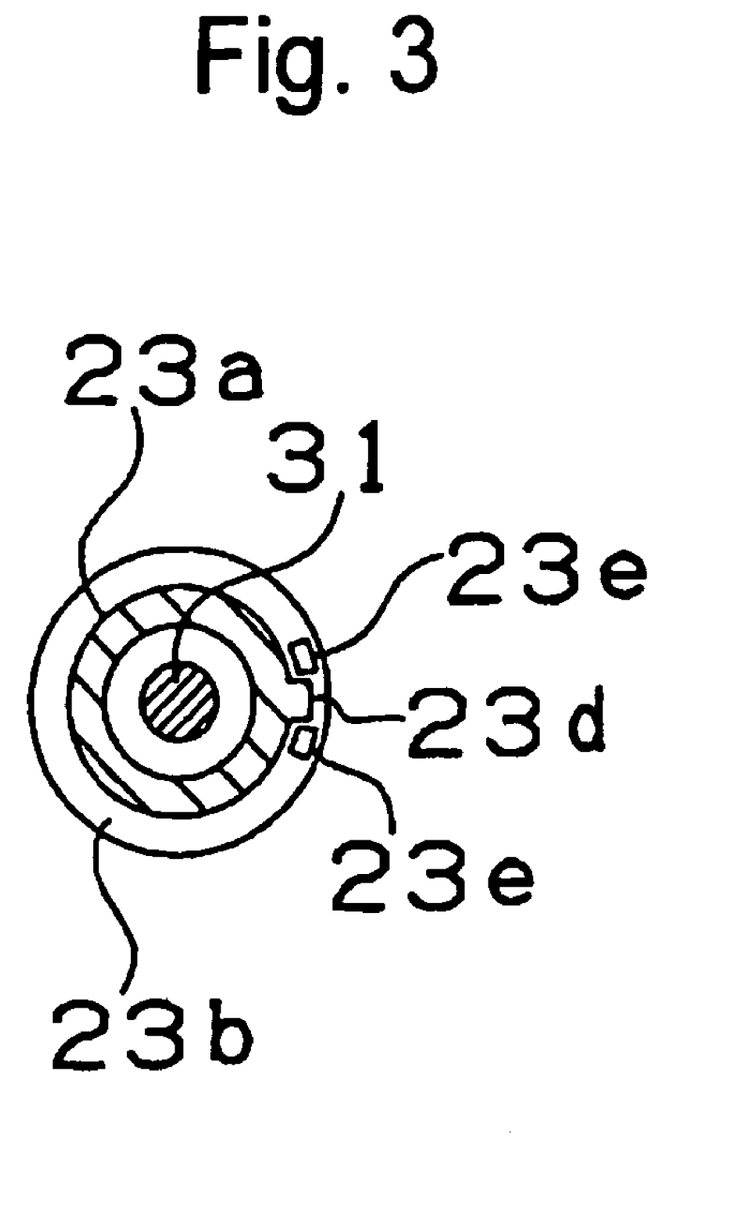
FIG. 3 is a cross section view taken along with line III—III in FIG. 2(A).

As shown in FIG. 3, which is a cross sectional view of FIG. 2 taken along with line B—B, a radial protrusion 23d is provided on the input shaft 23a of the pinion shaft 23. A pair of restricting portions 23e and 23e is provided on the top end of the output shaft 23b of the pinion shaft so as to restrict the rotation of the input shaft 23a by contacting the protrusion 23d. The contact between the protrusion 23d and the restricting portion 23e limits rotation of the torsion bar 31 with in 12 degrees (6 degree to −6 degree). That is, maximum torsion angle of the torsion bar 31 is limited within 12 degrees. The restricting portions 23e and the protrusion 23d serve as restriction means.

Figure 4:
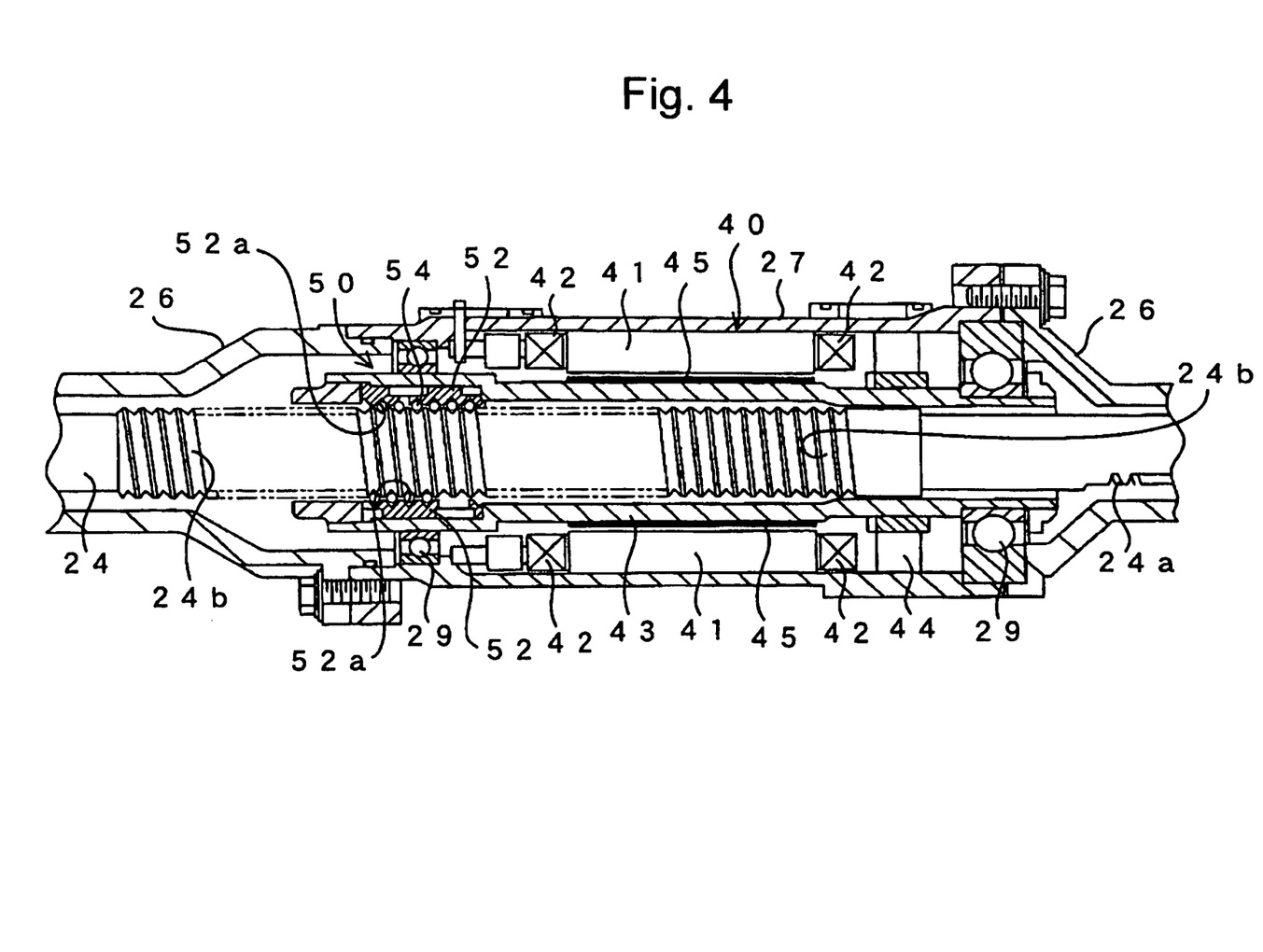
FIG. 4 is an enlarged view of the part surrounded by the ellipse designated by the dashed line IV in FIG. 1
Figure 5:
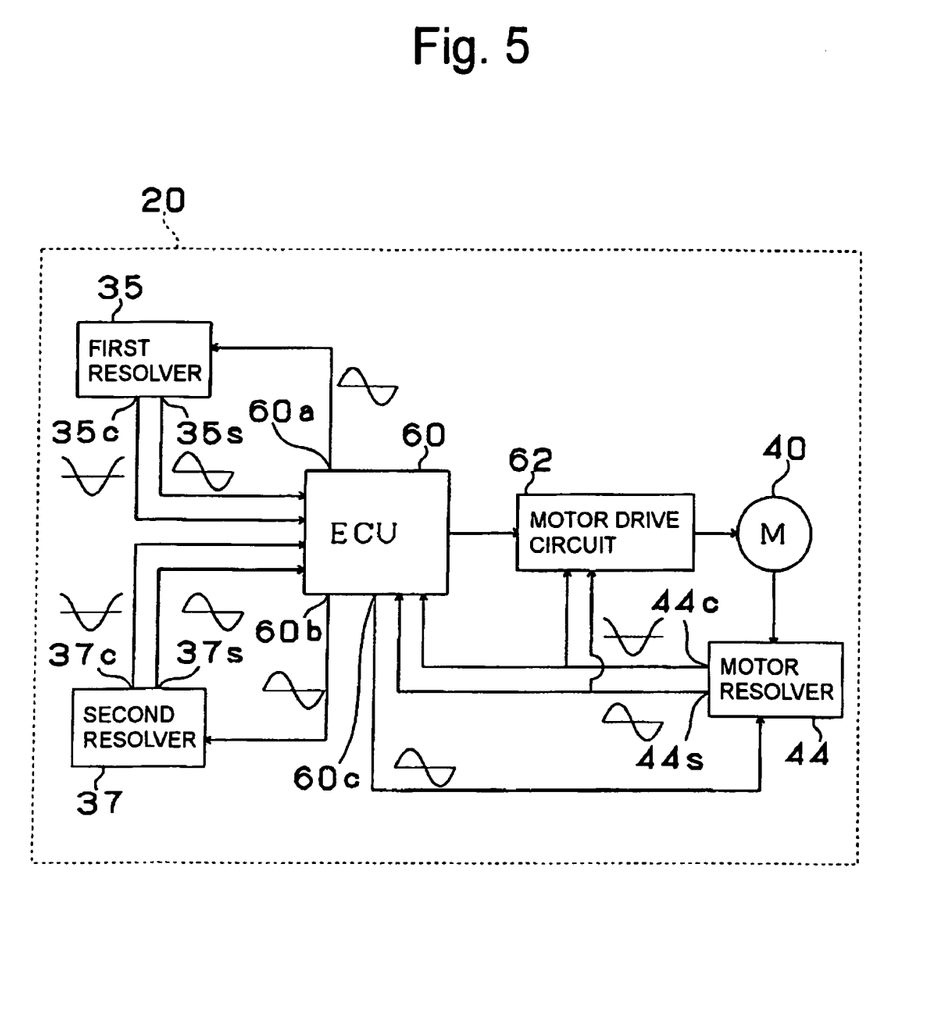
FIG. 5 is a block diagram showing a connecting configuration between resolvers and an ECU for controlling the electric power steering apparatus according to the embodiment of the present invention.

As shown in FIG. 1 and FIG. 4, the rack shaft 24 is accommodated in a rack housing 26 and a motor housing 27. A ball groove 24b is spirally formed on the intermediate portion of the rack shaft 24. A cylindrical motor shaft 43, which is supported by a bearing 29 so as to rotate coaxially with the rack shaft 24, is provided at outer circumference of the ball groove 24b. The motor shaft 43, a stator 41, an exciting coil 42 and the like configure the motor 40. Magnetic field generated by the exciting coil 42 wound on the stator 41 affects permanent magnets 45 disposed on outer periphery of the motor shaft 43 corresponding to a rotor. Thus, the motor shaft 43 can rotate.

A ball nut 52 is installed in the inner periphery of the motor shaft 43 and formed with spiral ball groove 52a. A plurality of balls 54 is interposed between the ball groove 52a of the ball nut 52 and the ball groove 24b of the rack shaft 24 with allowed its rolling motion. Thus, the ball screw mechanism 50, which can move the rack shaft 24 in the axial direction by the rotation of the motor 43.

Specifically, the ball screw mechanism 50, which is composed of the ball groove 24b, ball groove 52a and the like, can convert rotating torque in the forward and reverse directions of the motor 43 into reciprocating force in the axial direction of the rack shaft 24. This reciprocating force transmitted to the steering wheel as assist force for steering operation through the rack shaft 24 and the pinion shaft 23 configuring the rack and pinion mechanism. Notably, this configuration of the electric power steering apparatus 20 is so called a rack-assist-type power steering apparatus.

In the meanwhile, the motor resolver 44 capable of detecting the rotating angle (electrical angle) $\theta Me$ of the motor 43 is disposed between the motor shaft 43 of the motor 40 and the motor housing 27. The motor resolver 44 is electrically connected to the ECU 60 through a non-illustrated terminal (shown in FIG. 5).

FIG. 5 shows controlling configuration of the electric power steering apparatus 20 according to this embodiment. The ECU 60 outputs excitation signal E1 to the first resolver 35, the second resolver 37 and the motor resolver 44 via a terminal 60a, 60b and 60c, respectively. A Sin phase signal from a Sin output terminal 35s of the first resolver 35, a Cos phase signal from a Cos output terminal 35c, a Sin phase signal from a Sin output terminal 37s of the second resolver 37, and a Cos phase signal from a Cos phase terminal 37care inputted to the ECU 60. Then, the ECU 60 calculates a steenng torque T, and outputs assist command for assisting the steering operation in accordance with the steering torque T, to a motor drive circuit 62 as described later. The motor drive circuit 62 controls the motor 43 so as to generate the torque corresponding to the assist command. Rotating angle of the motor 40 is detected by the motor resolver 44. A Sin phase signal from Sin output terminal 44s and a Cos phase signal from Cos output terminal 44c are fed back to the motor drive circuit 62 and are inputted to the ECU 60. As described later, the ECU 60 calculates the steering torque of the steering wheel 21 on the basis of the signals from the first resolver 35, the second resolver 37 and the motor resolver 44, and computes the assist amount in accordance with the steering torque.

Figure 6:
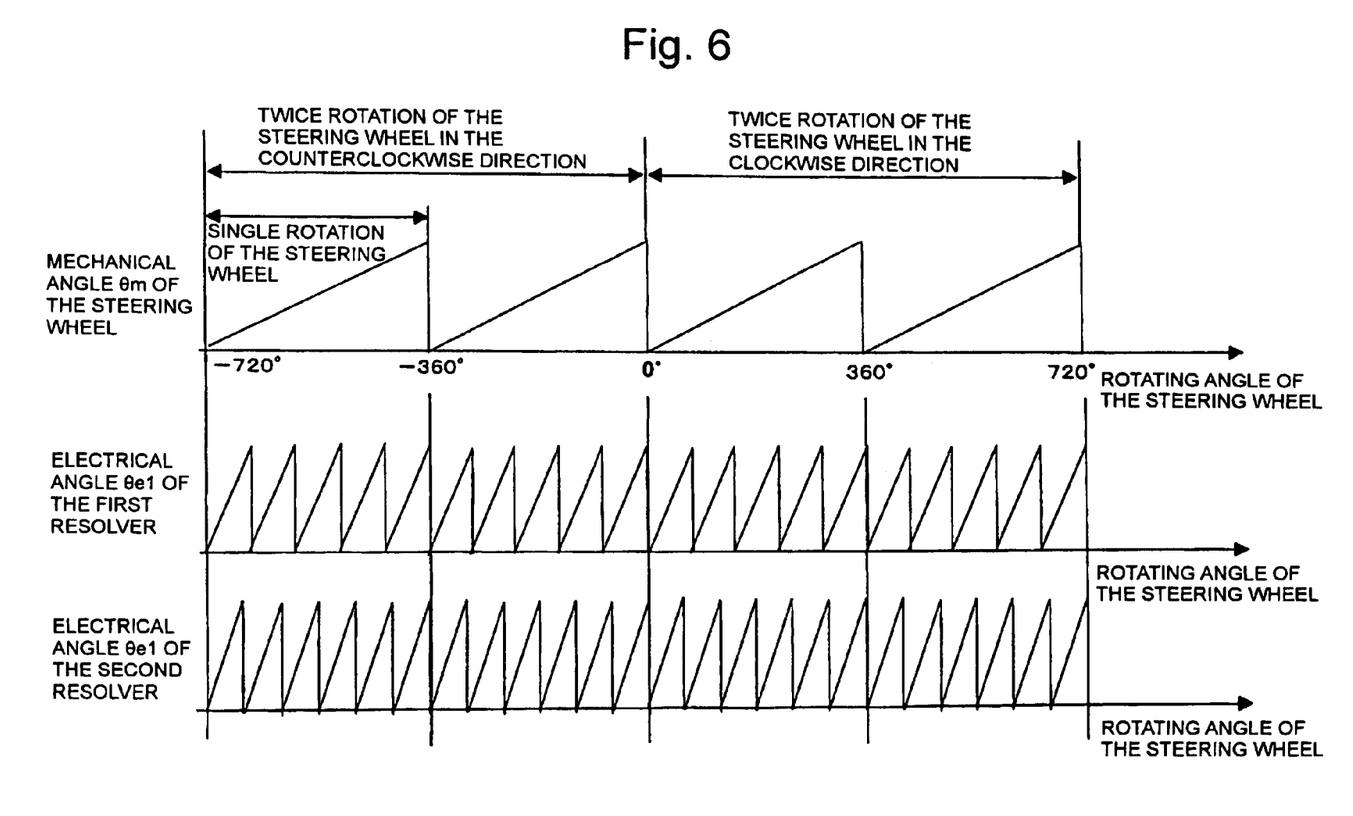
FIG. 6 is a graph showing the characteristics of resolver output signals of the first resolver and the second resolver and mechanical angle of the steering wheel versus the rotating angle of the steering wheel.

With referring to FIG. 6, the relation between rotating angle of the steering wheel 21 and outputs of the first and second resolvers 35 and 37 will be explained as below.

The electrical angle θe1 obtained from the first resolver 35 has five peak points per single rotation (between mechanical angel 360 degrees) of the steering wheel 21 because the first resolver 35 is a type of pole pair number 5. The first resolver 35 of pole pair number 5 has five pairs of N pole and S pole, so that it is capable of outputting electrical angle corresponding to 1800 degrees (360 degrees*5) with respect to mechanical of 360 degrees. That is, the first resolver 35 has fivefold resolution relative to the resolution of the resolver has one pole pair.

The electrical angle θe2 obtained from the second resolver 37 has six peak points per single rotation (between mechanical angel 360 degrees) of the steering wheel because the second resolver 37 is a type of pole pair number 6. The second resolver 37 of pole pair number 6 has six pairs of N pole and S pole, so that it is capable of outputting electrical angle corresponding to 2160 degrees (360 degrees*6) with respect to mechanical angle of 360 degrees. That is, the second resolver 37 has sixfold resolution relative to the resolution of the resolver has one pole pair.

As described above, the first and second resolvers output the electrical angles θe1 and θe2 as resolver output signals, respectively. However, as illustrated in FIG. 6, the electric angles θe1 and θe2 that are outputted at same rotating angle of the steering wheel 21 are not correspond with each other. Therefore, the ECU 60 can execute calculating transaction in accordance with the electric angle θe1 of first resolver 35 and the electrical angle θe2 of second resolver 37 so as to obtain the mechanical angle θm having high resolution with respect to single rotation of the steering wheel 21, without using the additional steering angle sensor.

Torque detection based on the resolver output signal outputted from the first and second resolvers 35 and 37 will be described below.

In case that the steering wheel 21 is steered by the driver or the like to rotate the input shaft 23a of the pinion shaft 23 at rotating angle θ1, the first resolver 35 outputs two kinds of alternating voltages E2 and E3 each having a different phase. The alternating voltages E2 (the Cos phase signal from Cos output signal) and E3 (the Sin phase signal from Sin output terminal) satisfy the relation following expressions (1) and (2).

$$E2 = K*E1*\cos\theta \quad (1)$$

$$E3 = K*E1*\sin\theta \quad (2)$$

Where K means translation ratio.

The angle θ can be calculated from expressions (1) and (2) by using the value obtained by dividing E3 by E2. The angle θ is the electric angle θe1 of the input shaft 23a of the pinion shaft 23. On the other hand, when the input shaft 23a rotates, the output shaft 23b which is connected to the input shaft 23a via the torsion bar 31 also rotates. The rotating angle θ2 of the output shaft 23b can be calculated from expressions (1) and (2) from the second resolve 37 by using the value obtained by dividing E3 by E2. Here, since the resolver is one kind of the electrical transformer, the translation ratio K varies in accordance with temperature variation. Thus, the Sin phase signal E3 and Cos phase singnal E2 also changes according to temperature variation. However, since the angle θ is calculated based on the value obtained by dividing E3 by E2, variation in the translation ratio K is cancelled, so that detecting accuracy is not affected by temperature variation.

In case of the rotation of the input shaft 23a and output shaft 23b of the pinion shaft 23, the torsion bar 31 is twisted so as to generate a relative rotating angle difference Δθ(=θ1−θ2) between the input shaft 23a and output shaft 23b. The steering torque T can be calculated on the basis of the rigidity of the torsion bar 31 and the relative rotating angle difference Δθ corresponding to torsion angle of the torsion bar 31. The ECU 60 executes assist control in accordance with the steering torque T so as to assist the steering operation of the driver by the assisting force generated by the motor 40.

Detection of the rotating angle (hereinafter referred to as motor rotating angle) of the motor shaft 43 based on the resolver output signal from the motor resolver 44 will be explained as follows.

If alternating voltage E1 is applied to the motor resolver 44 when the motor shaft 43 rotates at certain rotating angle, alternating voltages E2 and E3 (the Cos phase signal from the Cos output terminal and the Sin phase signal from the Sin output terminal 44s) are outputted from the motor resolver 44 in accordance with the applied voltage E1 and the rotating angle. The motor rotating angle is calculated from the applied alternating voltage E1 and outputted alternating voltages E2 and E3 according to the expressions (1) and (2). This detected motor rotating angle is used for various kinds of controls for the electric power steering apparatus 20.

Figure 10:
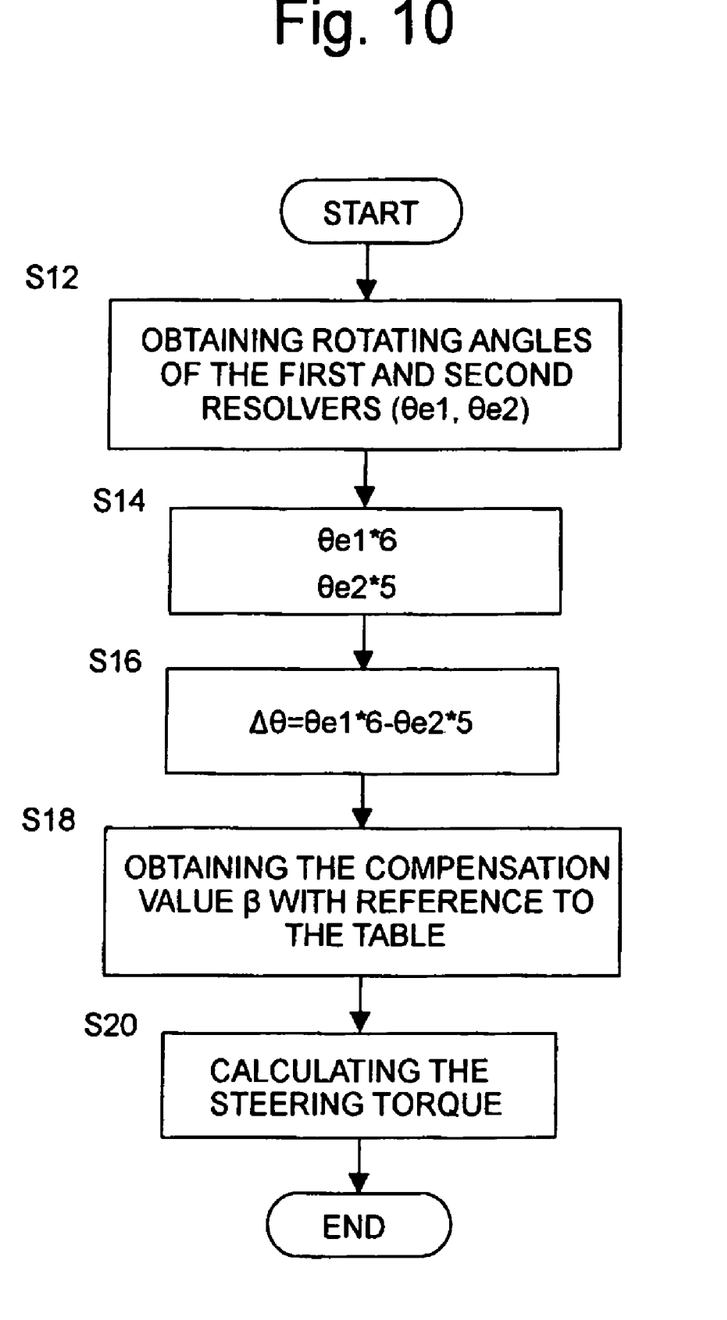
FIG. 10 is a flowchart showing an operation for calculating a torsion angle of a torsion bar.

In the present embodiment, the transaction for calculating the torsion angle of the torsion bar 31 based on the output signals of the first resolver 35 and second resolver 37 will be described in detail with reference to flowchart shown in FIG. 10.

Figure 7:
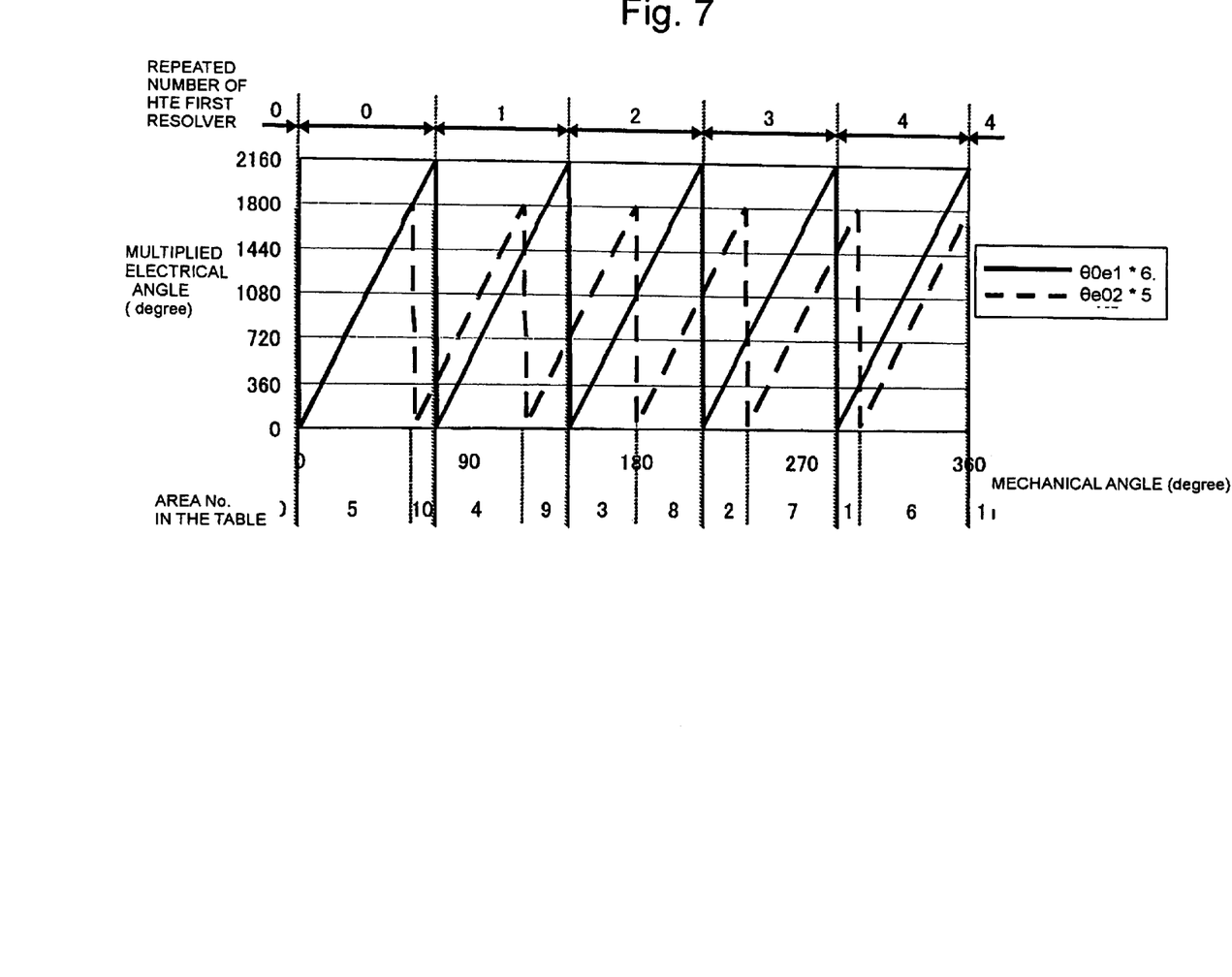
FIG. 7 is a graph showing the electrical angle obtained by multiplying the output signal $\theta0e1$ of the first resolver having five pole pairs by 6 and the output signal $\theta0e2$ of the second resolver having six pole pairs by 5.

As explained above, the first resolver 35 is a type of pole pair number 5 and the second resolver 37 is a type of pole pair number 6. The ECU 60 obtains the electrical angles θe1 and θe2 of the first and second resolvers 35 and 37 (S12). Then, in order that a gradient of the electrical angle θe1 corresponds to a gradient of the electrical angle θe2, the electrical angle θe1 of the first resolver 35 having five pole pairs is multiplied by six and the electrical angle θe2 of the second resolver 37 having six pole pairs is multiplied by five (S14). These multiplied electrical angles (degree) are shown in FIG. 7. In FIG. 7, a horizontal axis indicates mechanical angle (degree), and vertical axes designate multiplied electrical angles.

The electrical angle of the first resolver 35 of the pole pair number 5 indicates 0 at every 72 degree of the mechanical angle. The electrical angle of the second resolver 37 of the pole pair number 6 indicates 0 at every 60 degree of the mechanical angle. In the range of the mechanical angle 0 to 60 degree (area No. 5), the multiplied electrical angle of the first resolver 35 corresponds to the multiplied electrical angle of the second resolver 37. Since the multiplied electrical angle of the second resolver 37 once indicates 0 at 60 degree of mechanical angle, in the range of the mechanical angle 60 degree to 72 degree, the difference of 1800 degrees appears between the multiplied electrical angle of the first resolver 35 and the multiplied electrical angle of the second resolver 37 (area No. 10). Further, since the multiplied electrical angle of the first resolver 35 once indicates 0 at 72 degree of the mechanical angle, in the range of the mechanical angle 72 degree to 120 degree, the difference of −360 degrees appears between the multiplied electrical angle of the first resolver 35 and the multiplied electrical angle of the second resolver 37 (area No. 4). In the range of the mechanical angle 120 degree to 144 degree (area No. 9), the difference of 1440 degrees appears between the multiplied electrical angle of the first resolver 35 and the multiplied electrical angle of the second resolver 37. In the range of the mechanical angle 144 degree to 180 degree (area No. 3), the difference of −720 degrees appears between the multiplied electrical angle of the first resolver 35 and the multiplied electrical angle of the second resolver 37. In the range of the mechanical angle 180 degree to 216 degree (area No. 8), the difference of 1080 degrees appears between the multiplied electrical angle of the first resolver 35 and the multiplied electrical angle of the second resolver 37. In the range of the mechanical angle 216 degree to 240 degree (area No. 2), the difference of −1080 degrees appears between the multiplied electrical angle of the first resolver 35 and the multiplied electrical angle of the second resolver 37. In the range of the mechanical angle 240 degree to 288 degree (area No. 7), the difference of 720 degrees appears between the multiplied electrical angle of the first resolver 35 and the multiplied electrical angle of the second resolver 37. In the range of the mechanical angle 288 degree to 300 degree (area No. 1), the difference of −2440 degrees appears between the multiplied electrical angle of the first resolver 35 and the multiplied electrical angle of the second resolver 37. In the range of the mechanical angle 300 degree to 360 degree (area No. 6), the difference of 360 degrees appears between the multiplied electrical angle of the first resolver 35 and the multiplied electrical angle of the second resolver 37. If the mechanical angle is equal to or more than 360 degree (area No. 11), the difference of 160 degrees appears between the multiplied electrical angle of the first resolver 35 and the multiplied electrical angle of the second resolver 37. If the mechanical angle is less than 0 degree (area No. 0), the difference of −1800 degrees appears between the multiplied electrical angle of the first resolver 35 and the multiplied electrical angle of the second resolver 37.

Then, the difference value Δθ is obtained by subtracting the multiplied electrical angle of the second resolver 37 from the multiplied electrical angle of the first resolver 35 (Δθ=θe1*6−θe2*5), (S16).

Figure 8:
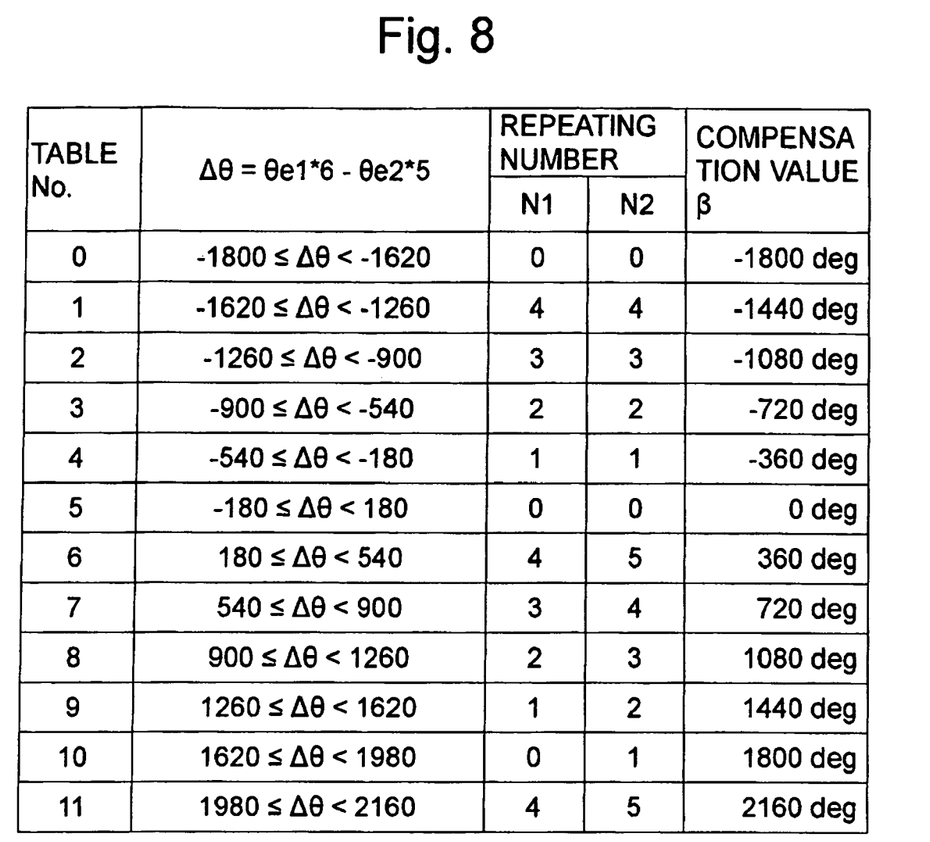
FIG. 8 shows a table for obtaining the compensation value $\beta$ corresponding to an angle difference $\Delta\theta$.

A compensation value β for compensating the difference value Δθ is obtained with reference to a table of areas (S18). The table for obtaining the compensation value β corresponding to the difference value Δθ is shown in FIG. 8. In the aforementioned range of the mechanical angle θ to 60 degree (area No.5), the difference value Δθ of electrical angle appears within −180 degree to 180 degree, therefore the compensation value β is equal to 0 degree. On the other hand, in the range of the mechanical angle 60 degree to 72 degree (area No. 10), the difference value Δθ of the electrical angle appears within the 1620 degree to 1980 degree, therefore the compensation value β is equal to 1800 degrees. In the meanwhile, a repeated number N1 means the repeated number of the electrical angle of the first resolver 35, and a repeated number N2 means the repeated number of the electrical angle of the second resolver 37. That is, when the mechanical angle rotates once (360 degrees of the mechanical angle), the electrical angle of the first resolver having five pole pairs rotates five times (360 degrees*5=1800 degrees). For example, in the area No. 4, the electrical angle of the first resolver 35 rotates once, and the electrical angle of the second resolver 37 rotates once. In the area No. 8, the electrical angle of the first resolver 35 rotates two times, and the electrical angle of the second resolver 37 rotates three times.

The value, which is obtained by subtracting the compensation value β from the difference value Δθ of the electrical angle, is divided by 30 to calculate the torsion angle (mechanical angle) between the first resolver 35 and second resolver 37. The calculated torsion angle is multiplied by a spring constant of the torsion bar 31 to obtain the steering torque (S20). In the meanwhile, '30' is used in the calculation because the multiplied electrical angle are obtained by multiplying the electrical angle of the first resorlver 35, whose pole pair number is 5, by 6. Thus, the torsion angle (mechanical angle) can be obtained from the value which is calculated by subtracting the compensation value β from the difference value Δθ.

In the present embodiment, the maximum torsion angle of the torsion bar 31 is limited within the 12 degrees (−6 degree to +6 degree) by the restricting pieces 23e explained above (referring to FIG. 3). Therefore, the calculation of the torsion angle is prevented from including error.

For example, when the pinion shaft 23 are not rotated and the torsion bar 31 is twisted at 6 degree (that is, the first resolve 35 is rotated at 6 degree with the second resolver 37 being fixed: the mechanical angle of the first resolver 35 is 6 degrees and the mechanical angle of the second resolver 37 is 0 degree), the difference value Δθ is 180 degrees (Δθ=6*5*5−0*6*5). Thus, difference value Δθ is belong to the area No. 5, therefore the compensation value β is 0 degree so that the compensated difference value (Δθ−β) is 180 degrees.

Further, when the pinion shaft 23 is rotated at 70 degree and the torsion bar 31 are not twisted (that is, the mechanical angle of the first resovler 35 and the mechanical angle of the second resolver 37 are both 70 degrees), the electrical angle of the second resolver 37 designates 10 degree because the electrical angle of the second resolver once indicate 0 degree at 60 degree of the mechanical angle. Therefore, the difference value Δθ is 1800 degrees (Δθ=70*5*5−10*6*5). Thus, since the difference value Δθ is belong to the area No. 10, so that the compensation value β is 1800 degrees and the compensated difference value (Δθ−β) is 0 degree. In this time, the repeated number N1 of the electric angle of the first resolver 35 is 0, and the repeated number N2 of the electrical angle of the second resolver 37 is 1.

As described above, even if the torsion bar 31 is twisted at wherever at the mechanical angle, the difference value Δθ is included within −1800 degree to 2160 (i.e. with in area No. 0 to No. 11). Specifically, in case of employing the first resolver 35 of the pole pair number 5 and the second resolver 37 of the pole pair number 6, the torsion angle can be adequately detected by restricting the maximum torsion angle of the torsion bar 31 within 12 degrees (+6 degree to −6 degree). Incase that the resolver of the pole pair number 6 is employed as first resolver 35 and the resolver of the pole pair number 5 is employed as second resolver 37, it is also preferable to restrict the maximum torsion angle of the torsion bar 31 within 12 degree (+6 degree to −6 degree).

The relationship between the combination of pole pair numbers of two resolvers and the torsion angle of the torsion bar will be explained as follows.

The pole pair number of one resolver is needed to differ from the pole pair number of the other resolver in order to detect the absolute angle (mechanical angle) without using an additional angle sensor.

If the difference between pole pair numbers of the two resolvers is eqeual to or greater than 2, the accuracy and resolution of the detection are deteriorated. Therefore, the following combinations of pole pair numbers are acceptable for actual use under the condition that the pole pair number is not greater than 10. '2 and 3', '3 and 4', '4 and 5', '5 and 6', '6 and 7', '7 and 8', '8 and 9', and '9 and 10'.

Figure 9A:
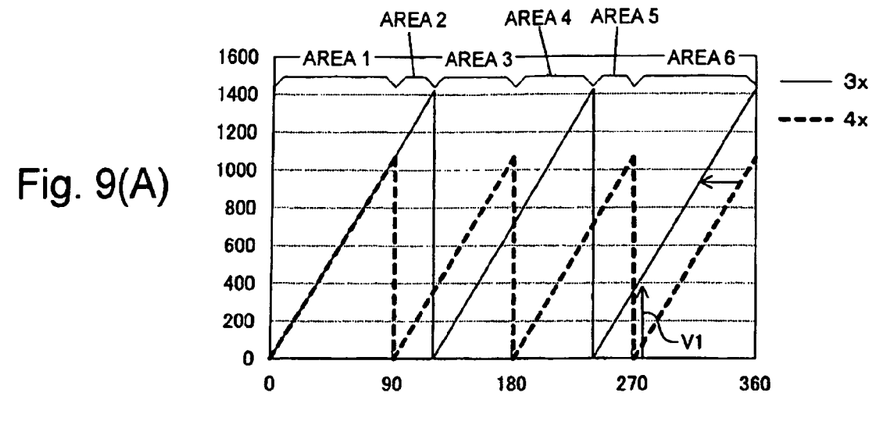
FIG. 9(A) is a graph showing the electrical angle obtained by multiplying the output signal of a resolver having three pole pairs by 4 and the output signal of a resolver having four pole pairs by 3.
Figure 9B:
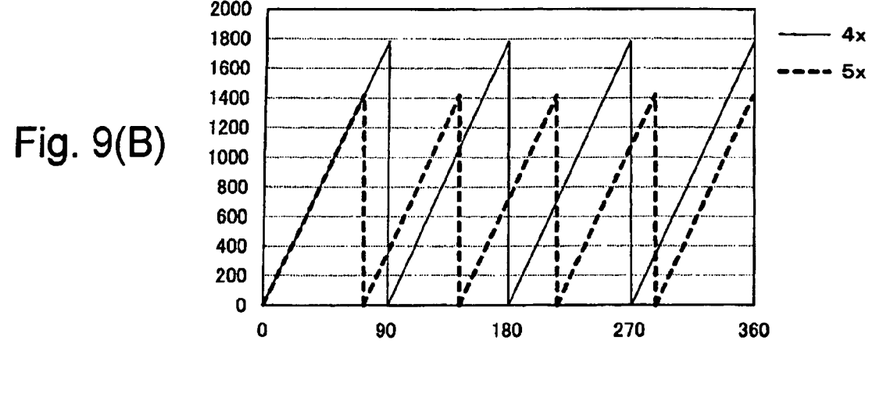
FIG. 9(B) is a graph showing the electrical angle obtained by multiplying the output signal of a resolver having four pole pairs by 5 and the output signal of a resolver having five pole pairs by 4.
Figure 9C:
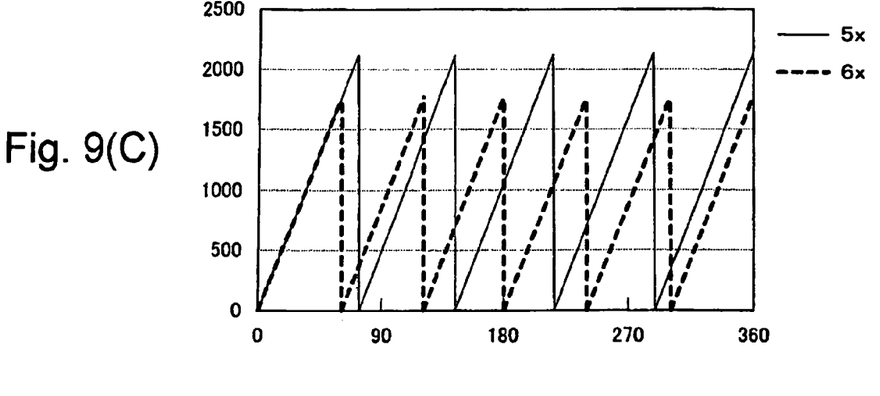
FIG. 9(C) is a graph showing the electrical angle obtained by multiplying the output signal of a resolver having five pole pairs by 6 and the output signal of a resolver having six pole pairs by 5.

FIG. 9(A) shows the relationship between the mechanical angle and electrical angles in case of the combination '3 and 4'. In FIG. 9(A), the electrical angle of the resolver whose pole pair number is 3 is multiplied by 4, and the electrical angle of the resolver whose pole pair number is 4 is multiplied by 3. FIG. 9(B) shows the relationship between the mechanical angle and electrical angles in case of the combination '4 and 5'. In FIG. 9(B), the electrical angle of the resolver whose pole pair number is 4 is multiplied by 5, and the electrical angle of the resolver whose pole pair number is 5 is multiplied by 4. In the same way, FIG. 9(C) shows the relationship between the mechanical angle and electrical angles in case of the combination '5 and 6'.

As shown in FIG. 9(A), in case of the combination '3 and 4', the compensation value β is 0 degree in an area No. 1. Here, in an area No. 6 which is adjacent to the area No. 1, when the mechanical angle of the resolver of the pole pair number 4 is rotated more than 30 degree of mechanical angle with the mechanical angle of the resolver of the pole pair number 3 being fixed, the graph shows same characteristic as the area No. 1. There is a possibility that the mechanical angle of the resolver of the pole pair number 4 is rotated in opposite direction. Therefore, relative rotation between two resolvers is need to be restricted within 30 degrees (+15 degree to −15 degree).

The maximum torsion angle of the torsion bar 31 for obtaining the compensation value β without mis-selecting the area is obtained by the following expression.

(the maximum torsion angle)=(360/n)*(n−1)−(360/m)*(m−1)

Where, each of 'n' and 'm' denotes the pole pair number, and satisfies the relation 'm<n'.

Therefore, the maximum torsion angle corresponding to the combination of the pole pair numbers is as follows.

Incase of the '2 and 3', the maximum torsion angle is 60 degrees (+30 degree to −30 degree).

Incase of the '3 and 4', the maximum torsion angle is 30 degrees (+15 degree to −15 degree).

Incase of the '4 and 5', the maximum torsion angle is 18 degrees (+9 degree to −9 degree).

In case of the '5 and 6', the maximum torsion angle is 12 degrees (+6 degree to −6 degree).

In case of the '6 and 7', the maximum torsion angle is 8.6 degrees (+4.3 degree to −4.3 degree).

In case of the '7 and 8', the maximum torsion angle is 6.4 degrees (+3.2 degree to −3.2 degree).

In case of the '8 and 9', the maximum torsion angle is 5 degrees (+2.5 degree to −2.5 degree).

In case of the '9 and 10', the maximum torsion angle is 4 degrees (+2 degree to −2 degree).

As described above, in the electric power steering apparatus 20 according to the present embodiment, the number 'm' of pole pairs of the first resolver is set at 5, the number 'n' of pole pairs of the second resolver is set at 6, and the maximum torsion angle of the torsion bar is set at 12 degrees (+6 degree to −6 degree). Therefore, in the configuration for detecting the steering torque with torsion bar, the steering torque can be detected with high accuracy. On the other hand, in case that the difference between pole pair numbers of the two resolvers is eqeual to or greater than 2, the accuracy and resolution of the detection are deteriorated. In case that the combination of pole pair numbers is '3 and 4', resolution of the detection is deteriorated. In case that the pole pair number exceeds that of the combination '5 and 6', the maximum torsion angle of the torsion bar becomes too small relative to the maximum torsion angle at the combination '5 and 6' as described above, so that the accuracy of the detection is deteriorated.

In the meanwhile, the calculating transaction for detecting the absolute angle of the steering wheel 21 is described in detail in the Japanese Patent Application No. 2002-196131 (International Patent Publication No. WO 2004/005843 A1) filed by applicant of present Application. Therefore, explanations of that are omitted.

Figure 11:
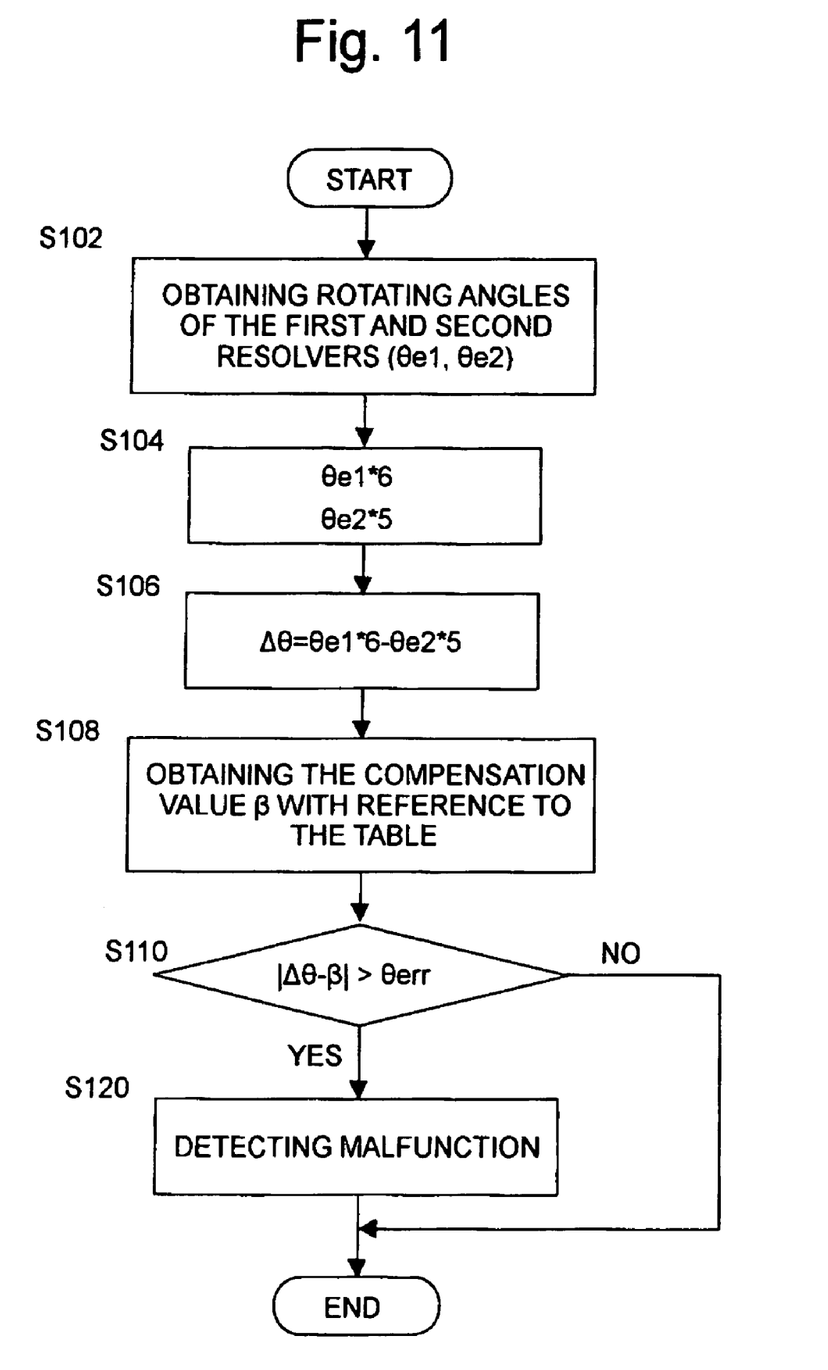
FIG. 11 is a flowchart showing an operation for detecting a malfunction.

Next, an operation for detecting the malfunction of the torque sensor of the electric power steering apparatus 20 configured above will be described with reference to FIG. 11. Since steps S102 to S108 in FIG. 11 are same as steps S12 to S18 in FIG. 10, the explanations thereof are omitted. Subsequently to S108, it is judged whether the absolute value of the compensated angle difference (Δθ−β) exceeds the maximum torsion angle θerr (12 degrees), which is restricted by the restricting piece 23e and the protrusion 23d for the torsion bar 31, or not (S110). In case that the absolute value does not exceed the maximum torsion angle of the torsion bar 31 (S110: No), the ECU 60 judged that the torque sensor 30 is normal to temporarily terminate the operation. On the other hand, in case that the absolute value exceeds the maximum torsion angle (S110: Yes), a malfunction detecting operation is executed (S120). As an example of the malfunction detecting operation, the assist amount for the power steering apparatus is gradually decreased.

In the electric power steering apparatus 20 of the embodiment, the restricting piece 23e and protrusion 23d serving as restricting means limit the maximum angle of the torsion bar 31. The ECU 60 judges whether the angle difference between the rotating angle detected by the first resolver 35 and the rotating angle detected by the second resolver 37 exceeds the maximum torsion angle of the torsion bar 31. When the difference exceeds the maximum torsion angle, it is judged that the malfunction occurs. In case that the difference exceeds maximum torsion angle limited by the restricting piece 23e and the protrusion 23d for the torsion bar 31, that is, in case that the difference which must not occur is detected, it is judged that the malfunction arises. Thus, the malfunction is detected in a short period of time.

The above embodiment has been described as the electric power steering apparatus 20 of the rack-assist-type power steering apparatus. However, present invention can be applied for a pinion-assist-type power steering apparatus, a column-assist-type power steering apparatus or the like. In such cases, the same effects as those in the above embodiment are obtained.

The embodiments of the present invention have been described in the foregoing specification and drawings. However, the invention which is intended to be protected is not to be construed as limited to the particular embodiment disclosed. Further, the embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations, changes and equivalents which fall within the spirit and scope of the present invention as defined in the claims, be embraced thereby.

What we claim is:

1. An electric power steering apparatus comprising:
   a steering wheel;
   a first resolver of pole pair number 'm', for detecting a rotating angle of a steering shaft connected to the steering wheel;

a second resolver of the pole pair number 'n', for detecting a rotating angle of the steering shaft through a torsion bar;

a motor for assisting a steering operation of the steering mechanism connected to the steering shaft;

a torsion calculating means for calculating the torsion angle of the torsion bar from a difference between the rotating angle detected by the first resolver and the rotating angle detected by the second resolver; and a motor controlling means for controlling the motor on the basis of an assist amount derived from the calculated torsion angle; wherein the torsion calculating means includes a table, for obtaining the compensation value in accordance with the value calculated by multiplying an electrical angle of the first resolver by 'n' and the value calculated by multiplying an electrical angle of the second resolver by 'm'.

2. The electric power steering apparatus according to claim 1, wherein the value of 'm' is smaller than the value of 'n', and maximum value of the torsion angle of the torsion bar is defined to satisfy an expression, "maximum torsion angle"=$(360/n)*(n-1)-(360/m)*(m-1)$.

3. The electric power steering apparatus according to claim 2, wherein the maximum value is defined by the restriction means.

4. The electric power steering apparatus according to claim 1, wherein the value of 'm' is larger than the value of 'n', and maximum value of the torsion angle of the torsion bar is defined to satisfy an expression, "maximum torsion angle"=$(360/m)*(m-1)-(360/n)*(n-1)$.

5. The electric power steering apparatus according to claim 4, wherein the maximum value is defined by the restriction means.

6. The electric power steering apparatus according to claim 1 further comprising a malfunction detecting means which judges that a malfunction occurs when the torsion angle obtained by the torsion calculating means exceeds the predetermined value.

7. An angle compensating method for a electric power steering apparatus comprising a steering wheel; a first resolver of pole pair number 'm' for detecting a rotating angle of a steering shaft connected to the steering wheel; a second resolver of the pole pair number 'n' for detecting a rotating angle of the steering shaft through a torsion bar; a motor for assisting a steering operation of the steering mechanism connected to the steering shaft; a torsion calculating means for calculating the torsion angle of the torsion bar from a difference between the rotating angle detected by the first resolver and the rotating angle detected by the second resolver and a motor controlling means for controlling the motor on the basis of an assist amount derived from the calculated torsion angle; wherein the compensation method comprising;

a step for multiplying an electrical angle of the first resolver by 'n' and multiplying an electrical angle of the second resolver by 'm';

a step for obtaining an angle difference between the multiplied electrical angle of the first resolver and the multiplied electrical angle of the second resolver;

a step for obtaining a compensation value from a table; and a step for subtracting the compensation value from the angle difference to obtain a compensated difference.

8. The angle compensating method for an electric power steering apparatus according to claim 7, wherein 'm' is set at 5, and 'n' is set at 6.

9. The angle compensating method for an electric power steering apparatus according to claim 7, wherein 'm' is set at 6, and 'n' is set at 5.

* * * * *